(12) United States Patent
Ouyang

(10) Patent No.: US 8,198,880 B2
(45) Date of Patent: Jun. 12, 2012

(54) CONSTANT ON-TIME CONVERTER AND THE METHOD OF OPERATION

(75) Inventor: Qian Ouyang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 409 days.

(21) Appl. No.: 12/688,577

(22) Filed: Jan. 15, 2010

(65) Prior Publication Data

US 2010/0181983 A1    Jul. 22, 2010

(30) Foreign Application Priority Data

Jan. 19, 2009    (CN) .......................... 2009 1 0058184

(51) Int. Cl.
*G05F 1/40* (2006.01)
(52) U.S. Cl. ...................... 323/284; 323/224; 363/21.04
(58) Field of Classification Search .................. 323/222, 323/224, 282–289, 267, 207; 363/16–17, 363/21.04, 21.07, 59, 65, 49; 327/131, 118, 327/176, 175, 156, 158, 217
See application file for complete search history.

(56) References Cited

U.S. PATENT DOCUMENTS

| | | | | |
|---|---|---|---|---|
| 3,883,755 | A * | 5/1975 | Faulkner | 327/2 |
| 5,754,414 | A * | 5/1998 | Hanington | 363/21.12 |
| 6,057,675 | A * | 5/2000 | Tateishi | 323/283 |
| 6,366,070 | B1 * | 4/2002 | Cooke et al. | 323/284 |
| 7,436,158 | B2 * | 10/2008 | Huang et al. | 323/224 |
| 7,714,547 | B2 * | 5/2010 | Fogg et al. | 323/224 |

* cited by examiner

*Primary Examiner* — Rajnikant Patel
(74) *Attorney, Agent, or Firm* — Perkins Coie LLP

(57) ABSTRACT

The present invention discloses a control circuit for constant on-time converter and a control method thereof. The proposed constant on-time DC/DC converter stabilizes the system and improves the performance of the load transient response without large equivalent series resistance of the output capacitor.

13 Claims, 6 Drawing Sheets

CONSTANT ON-TIME CONVERTER AND THE METHOD OF OPERATION

REFERENCE TO RELATED APPLICATION

This application claims priority to and the benefit of Chinese patent application No. 200910058184.6, filed on Jan. 19, 2009, which is incorporated herein by reference in its entirety.

FIELD OF THE INVENTION

The present invention relates to DC/DC converters and, in particular, the present invention relates to constant on-time DC/DC converters.

BACKGROUND

Constant on-time DC/DC converters are widely used in power conversion due to their excellent load transient response, simple internal configuration and smooth operation mode switching.

FIG. 1 shows a conventional constant on-time DC/DC converter 50. As shown in FIG. 1, a timer $U_1$ receives an input voltage $V_{IN}$ and an output voltage $V_O$ of the converter 50, wherein the timer $U_1$ is configured to provide a timing signal with a constant time. Meanwhile, resistors $R_1$ and $R_2$ constitute a feedback loop to divide the output voltage $V_O$ to provide a feedback signal $V_{FB}$ to the inverting input terminal of a comparator $U_2$. The non-inverting input terminal of the comparator $U_2$ receives a reference signal $V_R$ and the output terminal thereof is electrically coupled to a first input terminal of an AND gate $U_4$. The output terminal of the AND gate $U_4$ is electrically coupled to the set terminal S of a RS flip-flop $U_5$. The reset terminal R of the RS flip-flop $U_5$ receives the output signal of the timer $U_1$. The output terminal Q of the RS flip-flop $U_5$ is electrically coupled to the input terminal of a driver $U_6$, the timer $U_1$ and a minimum off-time circuit $U_3$, respectively. The minimum off-time circuit $U_3$ receives the output signal of the RS flip-flop $U_5$ and provides a low-level signal indicative of a minimum off-time $T_{OFF}$ to a second input terminal of the AND gate $U_4$. The two output signals of the driver $U_6$ respectively drive a high-side switch $M_1$ and a low-side switch $M_2$ of the output stage of the converter 50. Then the output voltage $V_O$ is obtained via a filter composed of an inductor L and an ideal capacitor $C_o$. The ESR shown in FIG. 1 is the equivalent series resistance of the ideal capacitor $C_O$.

In operation, the output signal of the comparator $U_2$ is high when the feedback signal $V_{FB}$ is lower than the reference signal $V_R$. If the output signal of the minimum off-time circuit $U_3$ is also high at that time, the AND gate $U_4$ will generate a high level signal to trigger the RS flip-flop $U_5$, so that the output signal of the RS flip-flop $U_5$ is high. Due to the high output signal of the RS flip-flop $U_5$, the high-side switch $M_1$ is turned on and the low-side switch $M_2$ is turned off through the driver $U_6$, so that the output voltage $V_O$ increases. When the output voltage $V_O$ increases to such an extent that the feedback signal $V_{FB}$ is higher than the reference signal $V_R$, the output signal of the comparator $U_2$ turns to low and thereby the set terminal S of the RS flip-flop $U_5$ is set to be zero, and the output signal of the RS flip-flop $U_5$ maintains the previous state. Meanwhile, the timer $U_1$ starts according to the high output signal of the RS flip-flop $U_5$ until a predetermined value is achieved, i.e., a constant on-time is expired. As a result, the output signal of the timer $U_1$ turns to high, and thereby the RS flip-flop $U_5$ is reset. Thus, the output signal of the RS flip-flop $U_5$ turns to low. Due to the low output signal of the RS flip-flop $U_5$, the high-side switch $M_1$ is turned off and the low-side switch $M_2$ is turned on through the driver $U_6$ so that the output voltage $V_O$ decreases. It should be noted that the inductor current decreases linearly when the high-side switch $M_1$ is off and the low-side switch $M_2$ is on. The inductor current may decrease to zero and then flow in reverse if the load current is relatively small. To prevent the inductor current from flowing in reverse, a common approach is to turn off the low-side switch $M_2$ or let it work as an equivalent micro-current source when the inductor current decreases to zero. Meanwhile, the low output signal of the RS flip-flop $U_5$ is also supplied to the minimum off-time circuit $U_3$, so that $U_3$ generates a low output signal which is supplied to the second input terminal of the AND gate $U_4$ to thereby disable the output signal of the AND gate $U_4$ during the minimum off-time $T_{OFF}$. In other words, the output signal of the AND-GATE $U_4$ is low at this interval no matter the output signal of the comparator $U_2$ is high or low. When the feedback signal $V_{FB}$ decreases to a value lower than the reference signal $V_R$, the output signal of the comparator $U_2$ will turn to high, and if the minimum off-time has expired at that time, the output signal of the AND gate $U_4$ will turn to high to set the RS flip-flop $U_5$, so that the converter 50 enters a new cycle.

Those skilled in the art can realize that the function of the minimum off-time circuit $U_3$ herein is as follows. While the converter 50 is in normal operation, after a constant on-time interval, the output signal of the RS flip-flop $U_5$ turns to low and thereby the high-side switch $M_1$ is turned off and the low-side switch $M_2$ is turned on. Thus, the output voltage $V_O$ starts to decrease. Due to noise interference, the comparator $U_2$ may enter a new cycle immediately after the constant on-time interval and then generate a high output signal to thereby set the RS flip-flop $U_5$, which causes the high-side switch $M_1$ to be turned on and the low-side switch $M_2$ to be turned off immediately and the output voltage $V_O$ starts to increase. To prevent such a situation, the minimum off-time circuit $U_3$ detects the low signal Q and supplies a low output signal to the AND gate $U_4$ to disable the high output signal produced by the comparator $U_2$ to ensure that the high-side switch $M_1$ is turned off and the low-side switch $M_2$ is turned on within the minimum off-time while the converter 50 is in normal operation.

FIG. 2(a) and FIG. 2(b) illustrate the waveforms of the driving signal of the high-side switch $M_1$, the voltage ripple across the equivalent series resistance ESR, the voltage ripple across the ideal capacitance $C_o$ and the output voltage ripple of the converter 50 shown in FIG. 1. As shown in FIG. 2(a) and FIG. 2(b), while the converter 50 is in steady operation, as the equivalent series resistance ESR has a relatively small resistance value compared to the load, the inductor current ripple can be considered to completely flow through the resistance ESR and the ideal capacitance $C_o$. As a result, a ripple voltage across the resistance ESR which is in phase with and amplitude proportional to the inductor current ripple is generated. Meanwhile, the ideal capacitance $C_o$ has an integral effect on the current ripple and thereby generates a capacitance ripple voltage which is 90 degree delayed to the inductor current ripple. When the resistance value of the resistance ESR is relatively large, the voltage ripple across the resistance ESR plays a dominant role compared to the voltage ripple across the ideal capacitance $C_o$, thereby the ripple of the output voltage $V_O$ of the converter 50 is determined mainly by the voltage ripple across the resistance ESR as shown in FIG. 2(a). Thus the output voltage $V_O$ is relatively stable. On the contrary, when the resistance value of the resistance ESR is relatively small, the voltage ripple across the ideal capacitance $C_o$ plays a dominant role compared to the voltage ripple across the resistance ESR, Thereby the ripple of the output voltage $V_O$ of the converter 50 is determined mainly by the voltage ripple across the ideal capacitance $C_o$. As a result, the system may produce sub-harmonic oscillation and lose stability, as shown in FIG. 2(b).

In sum, an equivalent series resistance ESR with large resistance value is needed in the conventional constant on-time DC/DC converter to stabilize the system. Accordingly, in special applications such as notebook computers, the conventional constant on-time DC/DC converter cannot adopt ceramic capacitors with small size and low price as output capacitors. Instead, a polymer organic semiconductor solid capacitors (sp-cap) is required which are relatively expensive.

Accordingly, there is a need to provide a constant on-time DC/DC converter which stabilizes the system even under the low equivalent series resistance situation, i.e., when the ceramic capacitors are used.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
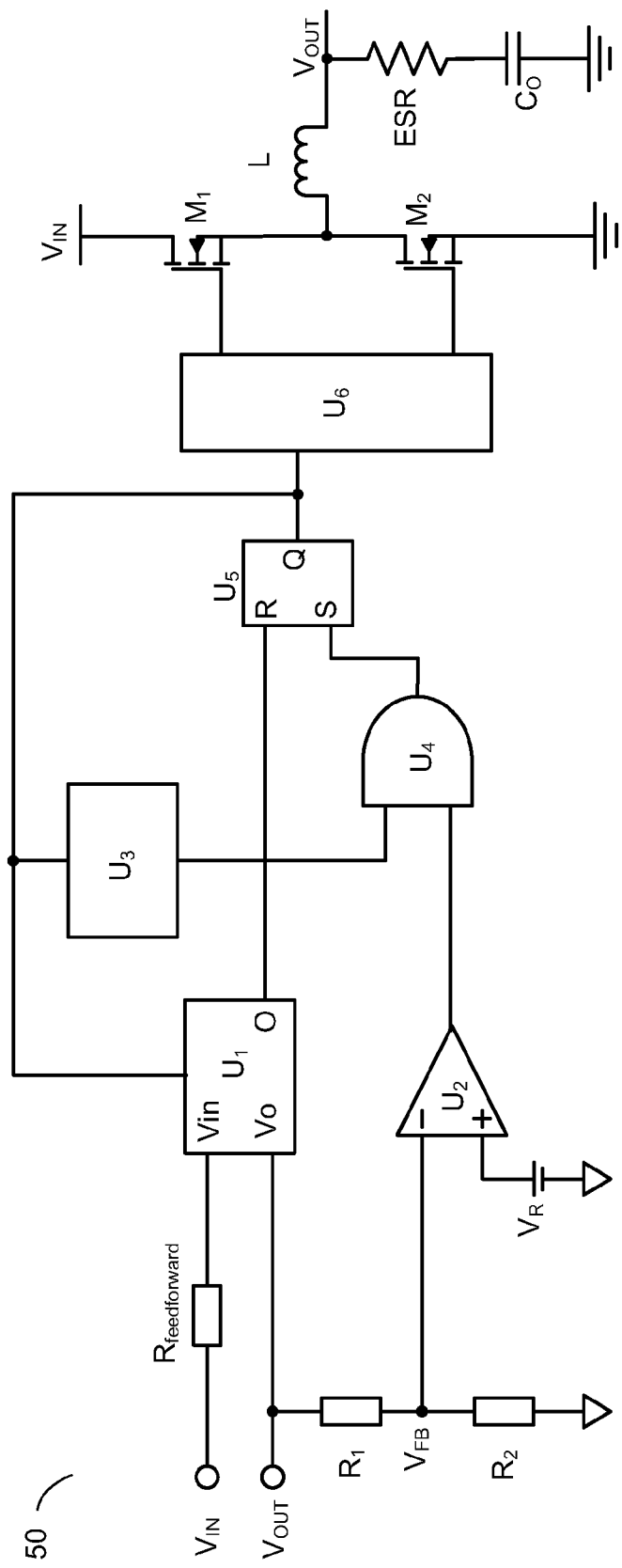
FIG. 1 shows a conventional constant on-time DC/DC converter.
Figure 2A:
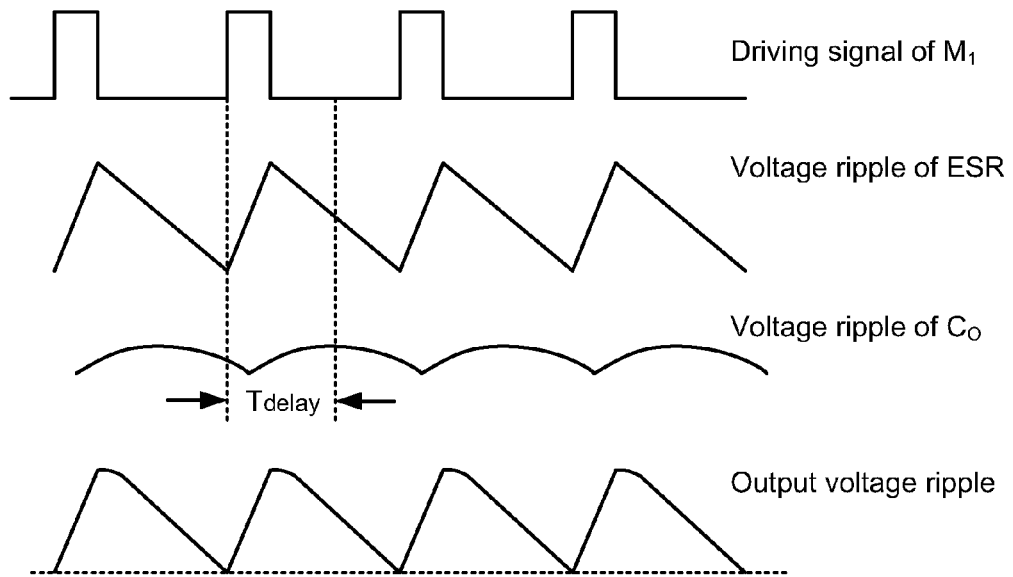
FIG. 2(a) shows a waveform diagram illustrating signals of the converter shown in FIG. 1 when the resistance value of the equivalent series resistance of the ideal capacitor is relatively large.
Figure 2B:
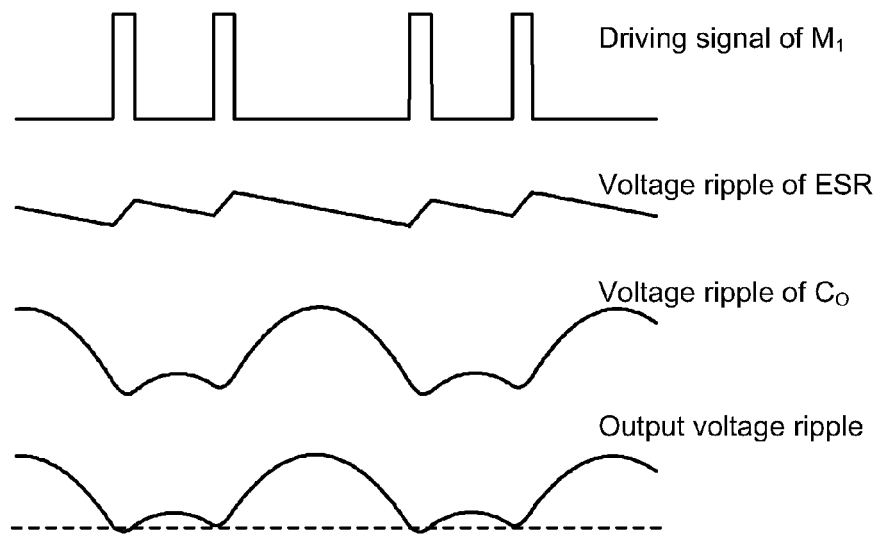
FIG. 2(b) shows a waveform diagram illustrating signals of the converter shown in FIG. 1 when the resistance value of the equivalent series resistance of the ideal capacitor is relatively small.
Figure 3:
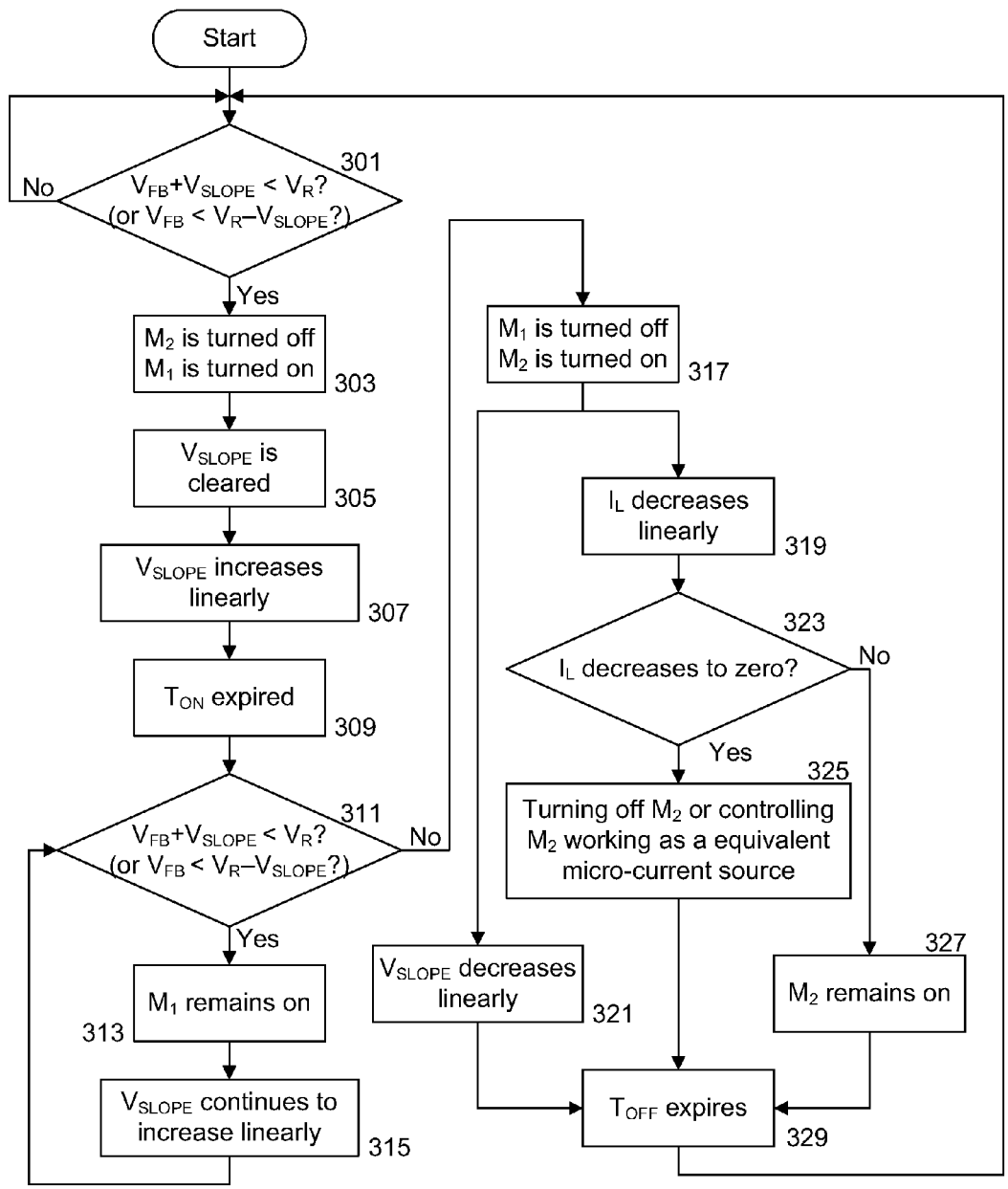
FIG. 3 shows a flow chart illustrating an improved constant on-time DC/DC converting method in accordance with the present invention.

FIG. 3 shows a flow chart illustrating an improved constant on-time DC/DC converting method in accordance with an embodiment of the present invention. At box 301, the algebraic sum of a feedback signal $V_{FB}$ and a compensation signal $V_{SLOPE}$ is compared with a reference signal $V_R$ when a constant on-time converter starts to operate. The output stage of the converter will maintain the previous state when the algebraic sum is higher than the reference signal $V_R$, i.e., when $V_{FB}+V_{SLOPE}>V_R$. At box 303, when the algebraic sum is lower than the reference signal $V_R$, i.e., when $V_{FB}+V_{SLOPE}<V_R$, a high-side switch $M_1$ is turned on and a low-side switch $M_2$ is turned off and the compensation signal $V_{SLOPE}$ is cleared at box 305. Afterwards, at box 307, the compensation signal $V_{SLOPE}$ starts to increase and the high-side switch $M_1$ remains on during a constant on-time interval $T_{ON}$. Thus, the output voltage $V_O$ of the converter increases. At box 309, after the constant on-time interval $T_{ON}$, at box 311, if there still exists $V_{FB}+V_{SLOPE}<V_R$, at box 313, the high-side switch $M_1$ remains on and the compensation signal $V_{SLOPE}$ continues to increase at box 315. Accordingly, the output voltage $V_o$ continues to increase. Thus, the feedback signal $V_{FB}$ continues to increase.

When the feedback signal $V_{FB}$ and the compensation signal $V_{SLOPE}$ increase to such an extent that $V_{FB}+V_{SLOPE}>V_R$, at box 317, the high-side switch $M_1$ is turned off and the low-side switch $M_2$ is turned on. Therefore the inductor current $I_L$ starts to decrease at box 319. Meanwhile, the compensation signal $V_{SLOPE}$ also starts to decrease at box 321. If the inductor current $I_L$ decreases to zero at box 323, the low-side switch $M_2$ will be turn off or will be controlled to work as an equivalent micro-current source at box 325. If the inductor current $I_L$ does not decrease to zero, at box 327, the low-side switch $M_2$ will remain on until a minimum off-time $T_{OFF}$ expires. At box 329, after the minimum off-time $T_{OFF}$, the converter goes back to the initial state to compare $V_{FB}+V_{SLOPE}$ with $V_R$ again. If $V_{FB}+V_{SLOPE}>V_R$, the converter remains the current state, that is, the high-side switch $M_1$ remains off and the low-side switch $M_2$ remains on. If $V_{FB}+V_{SLOPE}<V_R$, the high-side switch $M_1$ is turned on and the low-side switch $M_2$ is turned off. The converter starts a new cycle.

Alternatively, the converter can also compare the difference between the reference signal $V_R$ and the compensation signal $V_{SLOPE}$ with the feedback signal $V_{FB}$, i.e., the converter can compare $(V_R-V_{SLOPE})$ with $V_{FB}$. If $V_{FB}>(V_R-V_{SLOPE})$, the converter remains the current state. If $V_{FB}<(V_R-V_{SLOPE})$, the high-side switch $M_1$ is turned on and the low-side switch $M_2$ is turned off, the compensation signal $V_{SLOPE}$ is first cleared and then starts to increase.

The compensation signal $V_{SLOPE}$ is such a signal that it is firstly cleared to be zero and then starts to increase at the instant when the high-side switch $M_1$ is turned on and the low-side switch $M_2$ is turned off; and it starts to decrease at the instant when the high-side switch $M_1$ is turned off and the low-side switch $M_2$ is turned on. In other words, the compensation signal $V_{SLOPE}$ plays the role of the equivalent series resistance ESR of the output capacitor with large resistance in the prior art and is a ripple voltage with the same phase and amplitude proportional to the inductor current ripple. Accordingly, the slope of the compensation signal $V_{SLOPE}$ is proportional to $(V_{IN}-V_O)$ when the compensation signal $V_{SLOPE}$ increases and is proportional to $V_O$ when the compensation signal $V_{SLOPE}$ decreases, wherein $V_{IN}$ is the input voltage of the constant on-time converter and $V_O$ is the output voltage thereof.

Figure 4:
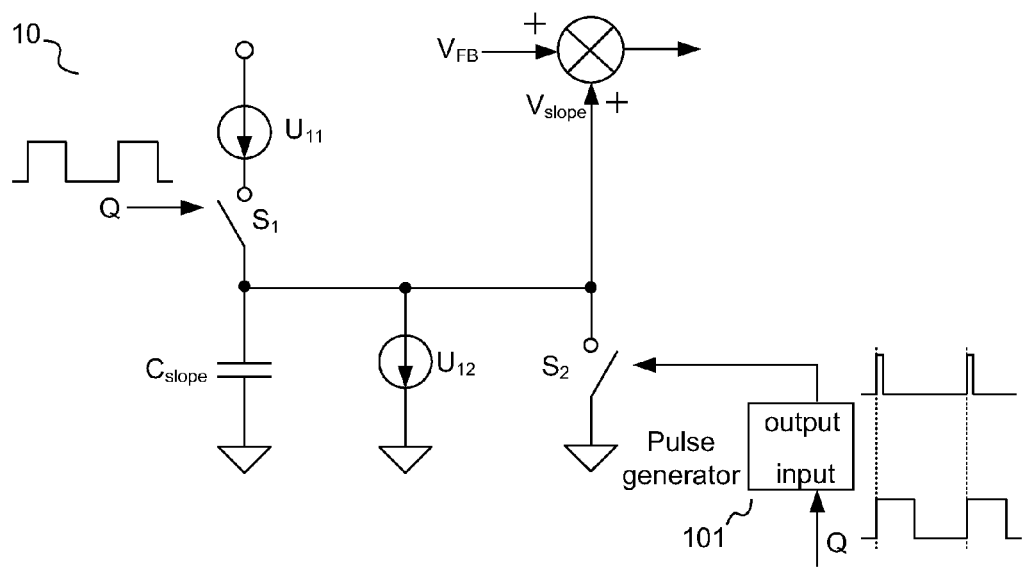
FIG. 4 shows a specific schematic diagram illustrating the compensation circuit in accordance with an embodiment of the present invention.

FIG. 4 shows a compensation circuit 10 for generating a compensation signal $V_{SLOPE}$ in accordance with an embodiment of the present invention. As shown in FIG. 4, the compensation circuit 10 comprises a first current source $U_{11}$, a first switch $S_1$, and a capacitor $C_{SLOPE}$ coupled in series. The compensation circuit 10 further comprises a second current source $U_{12}$ and a second switch $S_2$ coupled in parallel with the capacitor $C_{SLOPE}$, and a pulse generator 101 for generating pulses to control the on and off state of the second switch $S_2$. In one embodiment, the pulse generator 101 generates a short-pulse high level signal in response to a high level logical signal. The first switch $S_1$ is turned on in response to the high level logical signal. In one embodiment, the output current $I_1$ provided by the first current source $U_{11}$ is proportional to the input voltage $V_{IN}$ and the output current $I_2$ provided by the second current source $U_{12}$ is proportional to the output voltage $V_O$. The voltage across the capacitor $C_{SLOPE}$ is the compensation signal $V_{SLOPE}$.

When the high level logical signal is provided, the pulse generator outputs a short-pulse high-level signal. Therefore, the first switch $S_1$ and the second switch $S_2$ are both turned on and the second switch $S_2$ resets the voltage across the capacitor $C_{SLOPE}$. That is, the compensation signal $V_{SLOPE}$ is cleared to be zero at this instant. The second switch $S_2$ is turned off after the short pulse and thereby the first current source $U_{11}$ and the second current source $U_{12}$ act together to start to charge the capacitor $C_{SLOPE}$ with a charge slope of $(I_1-I_2)/C_{Cslope}$, wherein $C_{Cslope}$ is the capacitance of the capacitor $C_{SLOPE}$. The first switch $S_1$ is turned off when the logical signal turns to low and the second current source $U_{12}$ starts to discharge the capacitor $C_{SLOPE}$ with a discharge slope of $I_2/C_{SLOPE}$. The gate control signals of $S_1$ and $S_2$, the charge-discharge current $I_{Cslope}$ of the capacitor, and the compensation signal $V_{SLOPE}$ are shown in FIG. 5.

Figure 5:
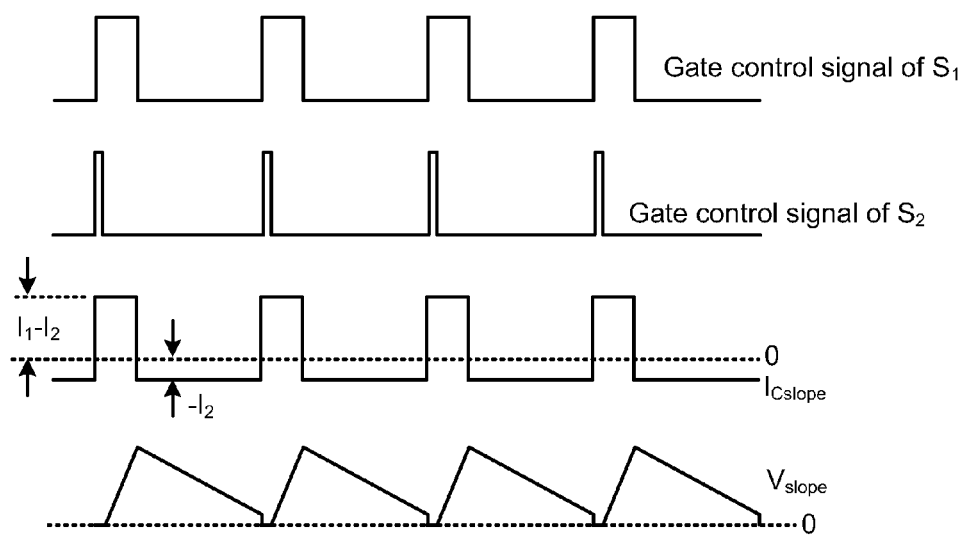
FIG. 5 shows a waveform diagram illustrating the control signals of the two switches, the charge-discharge current of the capacitor and the voltage across the capacitor of the compensation circuit shown in FIG. 4.

As can be shown from FIG. 5, since the second switch $S_2$ has reset the voltage across the capacitor $C_{SLOPE}$ before the first current source $U_{11}$ starts to charge the capacitor $C_{SLOPE}$, additional errors and an output voltage offset will not be introduced. The current $I_1$ is proportional to the input voltage $V_{IN}$ and the current $I_2$ is proportional to the output voltage $V_O$, thus the charge slope to the capacitor $C_{SLOPE}$ is proportional to $(V_{IN}-V_O)$ and the discharge slope to the capacitor $C_{SLOPE}$ is proportional to $V_O$, namely the increasing slope of the compensation signal $V_{SLOPE}$ is proportional to $(V_{IN}-V_O)$ and the decreasing slope of the compensation signal $V_{SLOPE}$ is proportional to $V_O$. Thus, the compensation signal $V_{SLOPE}$ functions as the same as the ripple voltage across the equivalent series resistance ESR of the output capacitor with large resistance in the prior art.

Figure 6:
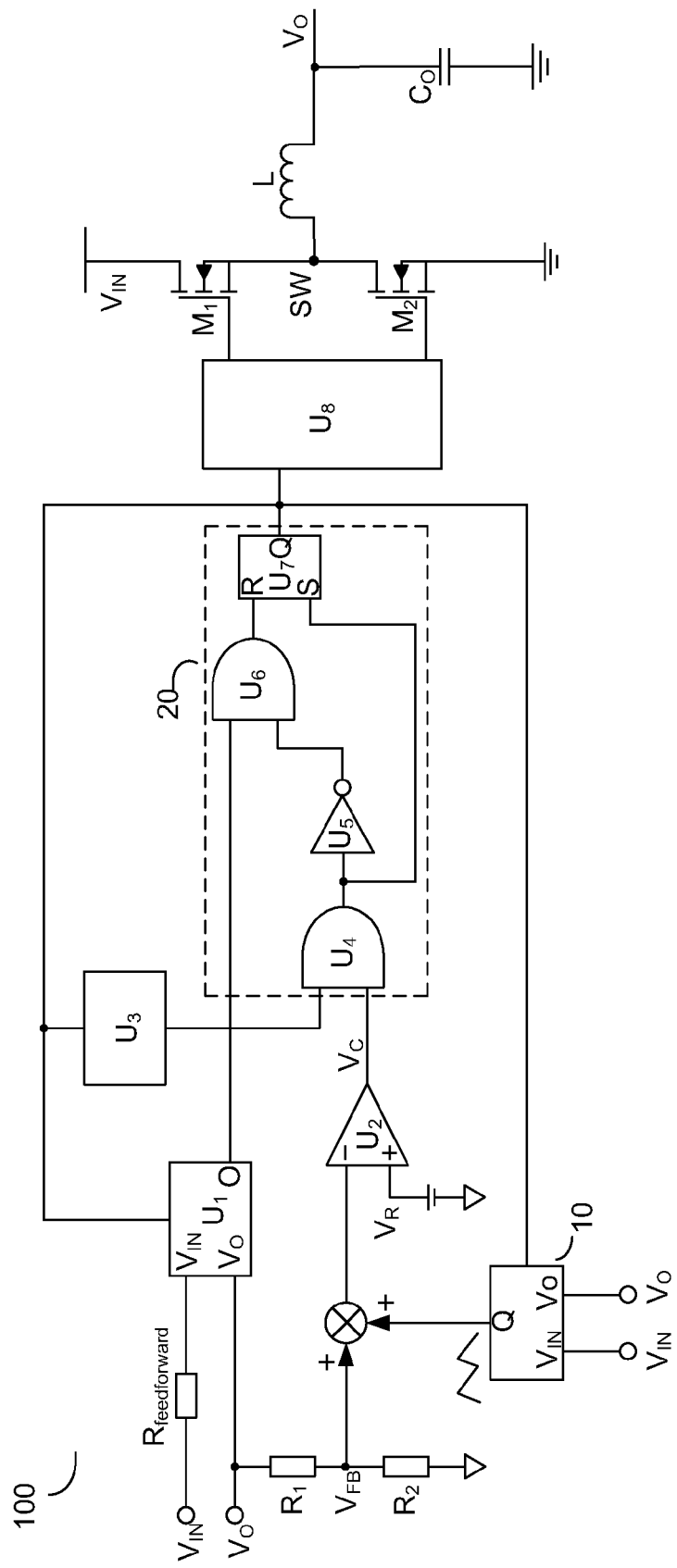
FIG. 6 shows an improved constant on-time DC/DC converter in accordance with an embodiment of the present invention.

FIG. 6 shows a constant on-time DC/DC converter 100 in accordance with an embodiment of the present invention. As shown in FIG. 6, the converter 100 adopts an additional compensation circuit 10 in one embodiment comparing to conventional DC/DC converter 50. In one embodiment, the converter 100 adopts a logic circuit 20 comprising a RS flip-flop $U_7$, an inverter $U_5$, a first AND gate $U_4$, and a second AND gate $U_5$ for improving the stability of the converter 100 when a load transient occurs. The remainder of the converter 100 is the same to converter 50.

In operation, the feedback signal $V_{FB}$ added with the compensation signal $V_{SLOPE}$ is supplied to the inverting input terminal of the comparator $U_2$ of which the non-inverting input terminal receives a reference signal $V_R$. Thus, the comparator $U_2$ provides a comparison signal $V_C$ by comparing the sum of the feedback signal $V_{FB}$ and the compensation signal $V_{SLOPE}$ with the reference signal $V_R$. The comparison signal $V_C$ is then sent to a first input terminal of the first AND gate $U_4$. A second terminal of the first AND gate $U_4$ receives the minimum off-time signal from the minimum off-time circuit $U_3$. The output terminal of the first AND gate $U_4$ is electrically coupled to the set terminal S of the RS flip-flop $U_7$ and an input terminal of an inverter $U_5$. The output terminal of the inverter $U_5$ is electrically coupled to a first input terminal of the second AND gate $U_6$. A second input terminal of the second AND gate $U_6$ receives the output signal of the timer $U_1$. The output terminal of the second AND gate $U_6$ is electrically coupled to the reset terminal R of the RS flip-flop $U_7$. The RS flip-flop $U_7$ provides the logical signal in response to the output signals of the first AND gate $U_4$ and the second AND gate $U_6$. Then the logical signal is sent to the driver $U_8$ and the input terminals of the minimum off-time circuit $U_3$ and the timer $U_1$.

In one embodiment, the timer $U_1$ further receives the input voltage $V_{IN}$ of the converter 100 through a feed-forward resistor $R_{feedforward}$ and the output voltage $V_O$ of the converter 100. The driver $U_8$ provides two output signals to drive the high-side switch $M_1$ and the low-side switch $M_2$ of the output stage of the converter 100, respectively. Thus a square wave signal is obtained at node SW. And the output voltage $V_O$ is obtained from the square wave signal via a filter comprised by an inductor L and an output capacitor $C_O$.

In operation, the input voltage $V_{IN}$ of the converter 100 is supplied to the output stage through the high-side switch $M_1$ and supplied to the timer $U_1$ directly. As illustrated hereinbefore, the timer $U_1$ also receives the output voltage $V_O$ of the converter 100 and the logical signal. The timer $U_1$ starts to record when the logical signal is high and outputs a high level signal to the second AND gate $U_6$ when recording to $T_{ON}=n\times V_O/V_{IN}$, wherein n is a predetermined constant value.

In addition, the output voltage $V_O$ of the converter 100 is supplied to the second input terminal of the timer $U_1$ on one hand, and produces a feedback signal $V_{FB}$ after through a feedback loop composed of a resistor $R_1$ and a resistor $R_2$. In one embodiment, the feedback signal $V_{FB}$ which is proportional to the output voltage $V_o$ of the converter 100 and the compensation signal $V_{SLOPE}$ is added together and the algebraic sum thereof is supplied to the inverting input terminal of the comparator $U_2$. The comparator $U_2$ outputs a high level signal when $V_{FB}+V_{SLOPE}<V_R$. And meanwhile, the logical signal is still high, thus the minimum off-time signal is still high and therefore the output of the first AND gate $U_4$ remains high. This high level signal turns to low via the inverter $U_5$, so that the output signal of the second AND gate $U_6$ is low. Accordingly, the logical signal remains unchanged. Therefore the high-side switch $M_1$ is still on and the low-side switch $M_2$ is still off and thereby the compensation signal $V_{SLOPE}$ continues to increase. The high-side switch $M_1$ remains on for a long time, thus providing a good load transient response when a load step-up transient occurs.

When the load moves to a heavy load condition from a light load condition (the load current increases rapidly), the output voltage $V_O$ decreases rapidly and accordingly, the feedback signal $V_{FB}$ decreases rapidly as well. After a constant on-time interval $T_{ON}$, if the algebraic sum of the feedback signal $V_{FB}$ and the compensation signal $V_{SLOPE}$ is still lower than the reference signal $V_R$, namely $V_{FB}+V_{SLOPE}<V_R$, the high-side switch $M_1$ will remain on and the low-side switch $M_2$ will remain off until the output voltage $V_O$ and the compensation signal $V_{SLOPE}$ increase to such an extent that $V_{FB}+V_{SLOPE}>V_R$. If $V_{FB}+V_{SLOPE}>V_R$, the comparator $U_2$ will output a low level accordingly the inverter $U_5$ will output a high level signal, which causes the RS flip-flop $U_7$ to be reset, and the logical signal to be low. The minimum off-time circuit $U_3$ detects the low level logical signal, and outputs a low level signal to the first AND gate $U_4$. as a result, the output signal of the first AND gate $U_4$ is low during this minimum off-time interval $T_{OFF}$. Thereby the high-side switch $M_1$ is off and the low-side switch $M_2$ is on during the minimum off-time interval $T_{OFF}$. Subsequently, the converter 100 starts a new cycle and operates in a normal mode until the load transient is finished.

Figure 7:
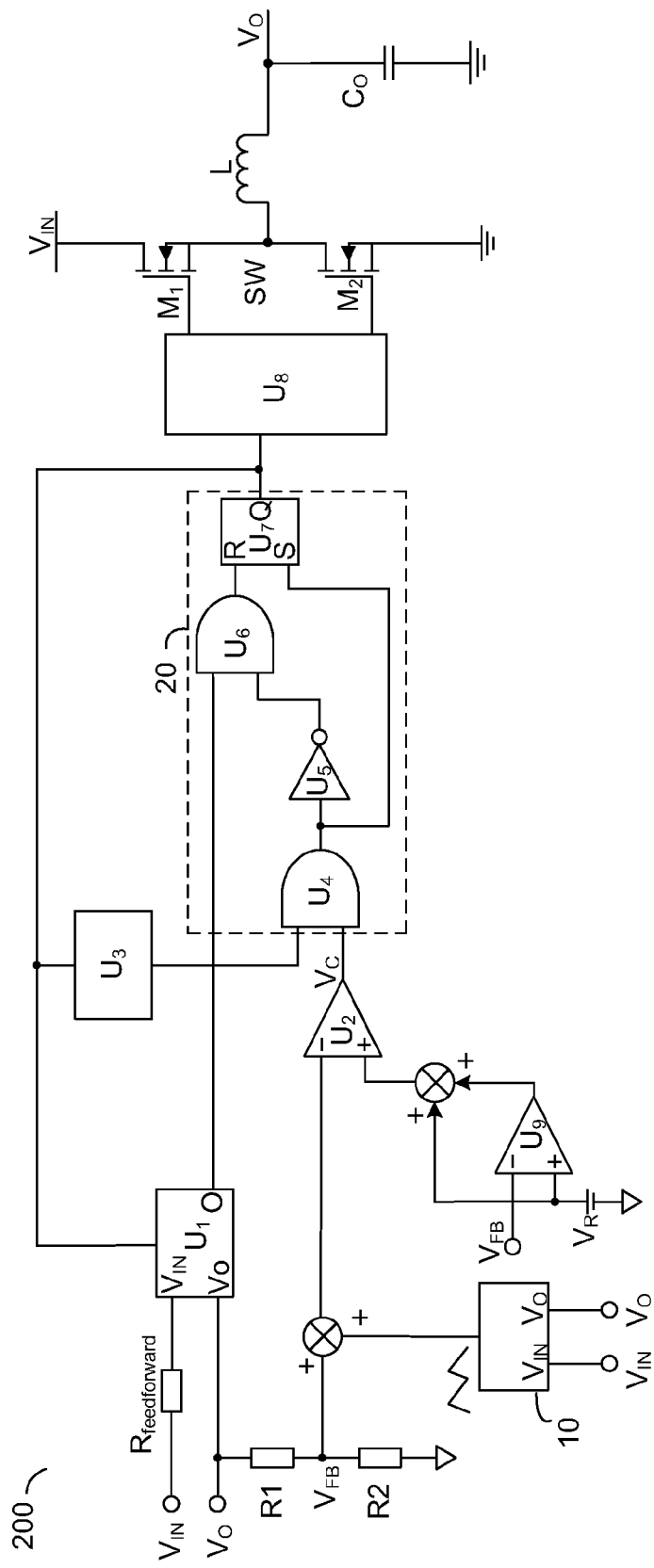
FIG. 7 shows an improved constant on-time DC/DC converter in accordance with another embodiment of the present invention.

FIG. 7 shows a constant on-time DC/DC converter 200 in accordance with another embodiment of the present invention. Different to the converter 100 shown in FIG. 6, the comparison circuit in the converter 200 comprises an operation amplifier $U_9$ and a comparator $U_2$. The non-inverting input terminal of the operational amplifier $U_9$ receives the reference signal $V_R$, the inverting input terminal of the operational amplifier $U_9$ receives the feedback signal $V_{FB}$ and the amplified signal output by the operation amplifier $U_9$ is added with the reference signal $V_R$ and the algebraic sum is supplied to the non-inverting input terminal of the comparator $U_2$. The comparator $U_2$ provides the comparison signal $V_C$ by comparing the sum of the amplified signal and the reference signal $V_R$ with the feedback signal $V_{FB}$. This is because that in some applications, the equivalent series resistance of the output capacitor and the compensation signal may introduce some DC errors, namely cause some DC errors between $V_O$ and the predetermined value. To solve this problem, the converter 200 in one embodiment adopts an error compensation net to eliminate the DC errors between $V_O$ and the predetermined value. For example, the amplified signal provided the operational amplifier $U_9$ will be negative if the output voltage $V_O$ is slightly higher than the predetermined value, which causes the voltage at the non-inverting input terminal of the operational amplifier $U_9$ to be lower than the reference signal $V_R$ to thereby regulate the output voltage $V_O$, causing the output voltage $V_O$ to decrease to reach the predetermined value. In short, the compensation net added in the converter 200 shown in FIG. 7 suppresses the DC errors of the output voltage $V_O$ by regulating the voltage at the non-inverting input terminal of the comparator $U_2$. Those skilled in the art should realize that the same result can be obtained by regulating the voltage at the inverting input terminal of the comparator $U_2$ to suppress the DC errors, which will not be described hereinafter.

The remainder of the converter 200 is the same to that of the converter 100 shown in FIG. 6.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A control circuit for constant on-time converters, comprising:
    a timer for providing timing signal with a constant time;
    a minimum off-time circuit for providing a minimum off-time signal;
    a feedback loop for feeding back the output signal of the converter and providing a feedback signal;
    a comparison circuit for providing a comparison signal in response to the feedback signal, a reference signal and a compensation signal;
    a logic circuit for providing a logical signal in response to the timing signal, the minimum off-time signal and the comparison signal; wherein the logic circuit comprises:
    a first AND gate, operable to receive the minimum off-time signal and the comparison signal;
    an inverter, coupled to the output terminal of the first AND gate, operable to provide an inverted signal;
    a second AND gate, operable to receive the timing signal and the inverted signal;
    a RS flip-flop, operable to provide the logical signal in response to the output signals of the first AND gate and the second AND gate,
    a driver for providing driving signals to the output stage of the converter in response to the logical signal; and
    a compensation circuit for providing the compensation signal, wherein the compensation circuit comprise a first current source, a second current source, a first switch, a second switch, and a capacitor, wherein the first current source, the first switch and the capacitor are coupled in series, the second switch and second current source are coupled in parallel with the capacitor.

2. The control circuit as claimed in claim 1, wherein the timer provides the timing signal in response to an input signal of the converter, the output signal of the converter, and the logical signal.

3. The control circuit as claimed in claim 1, wherein the minimum off-time circuit provides the minimum off-time signal in response to the logical signal.

4. The control circuit as claimed in claim 1, wherein the compensation circuit provides the compensation signal in response to the logical signal.

5. The control circuit as claimed in claim 1, wherein the voltage across the capacitor is the compensation signal.

6. The control circuit as claimed in claim 1, wherein the current provided by the first current source is proportional to the input signal, the current provided by the second current source is proportional to the output signal.

7. The control circuit as claimed in claim 1, wherein the compensation circuit further comprises a pulse generator, which generates a short-pulse signal in response to the logical signal.

8. The control circuit as claimed in claim 7, wherein the first switch is controlled to be on and off in response to the logical signal; the second switch is controlled to be on in response to the short-pulse signal.

9. The control circuit as claimed in claim 1, wherein the comparison circuit comprises a comparator.

10. The control circuit as claimed in claim 1, wherein the comparison circuit comprises:
    an operational amplifier, operable to provide an amplified signal in response to the feedback signal and the reference signal;
    a comparator, operable to provide the comparison signal by comparing the sum of the amplified signal and the reference signal with the feedback signal.

11. A method for controller a power converter, comprising:
- providing a comparison by comparing a reference signal with the sum of a feedback signal and a compensation signal; wherein the feedback signal is proportional to the output voltage of the converter;
- providing a minimum off-time signal;
- turning on a high-side switch and turning off a low-side switch in response to the minimum off-time signal and the comparison signal; and
- turning off the high-side switch and turning on the low-side switch in response to a constant on-time signal; wherein the constant on-time signal is provided in response to the input signal, the output signal of the converter and the turning on high-side switch.

12. The method as claimed in claim 11, wherein the compensation signal starts to increase linearly from zero in response to the high-side switch's turning on.

13. The method as claimed in claim 11, wherein the compensation signal starts to decrease in response to the low-side switch's turning on.

* * * * *